May 17, 1938.　　D. E. LEWELLEN ET AL　　2,117,484
SPEED SYNCHRONIZING DEVICE
Filed Sept. 23, 1935　　7 Sheets-Sheet 4

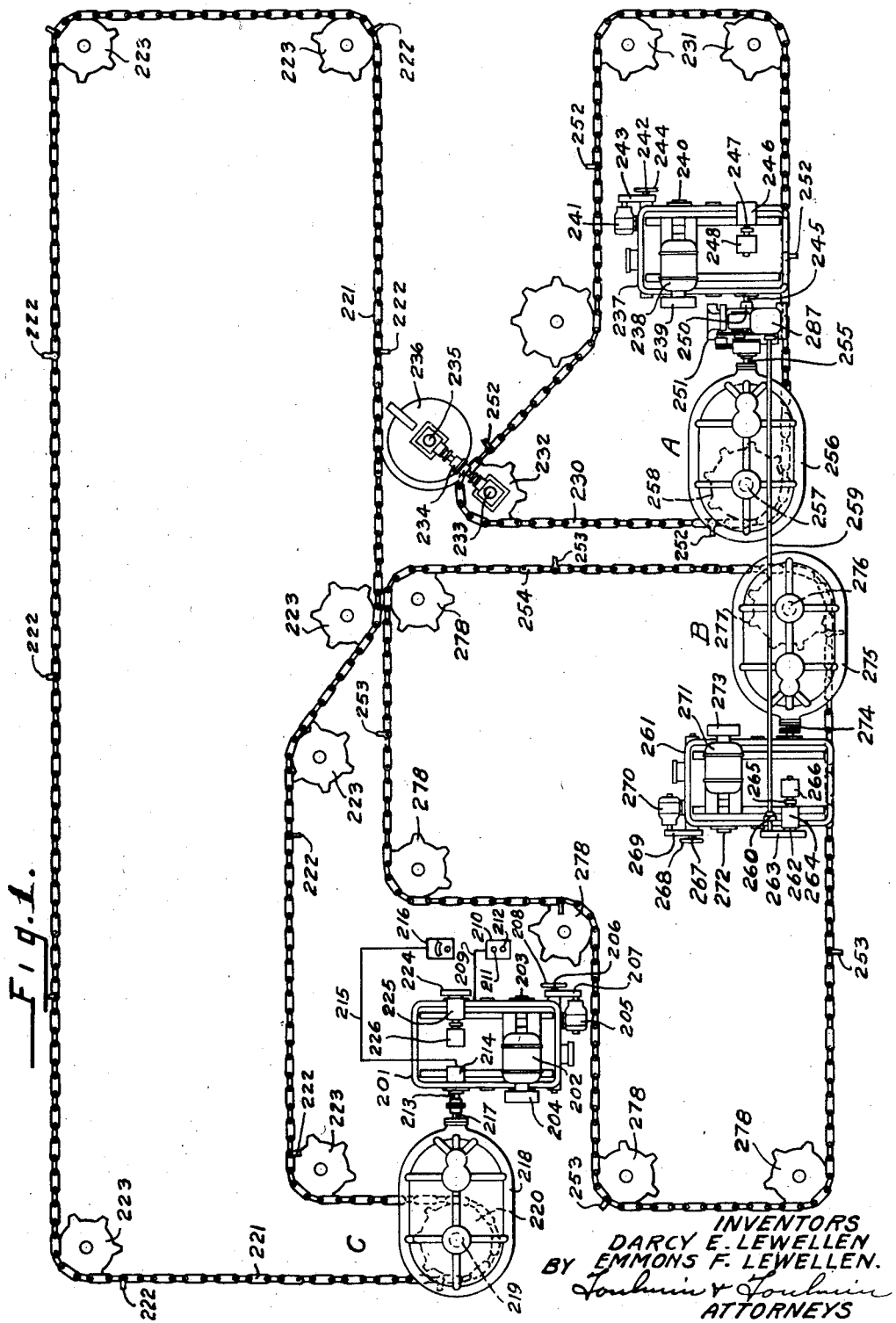

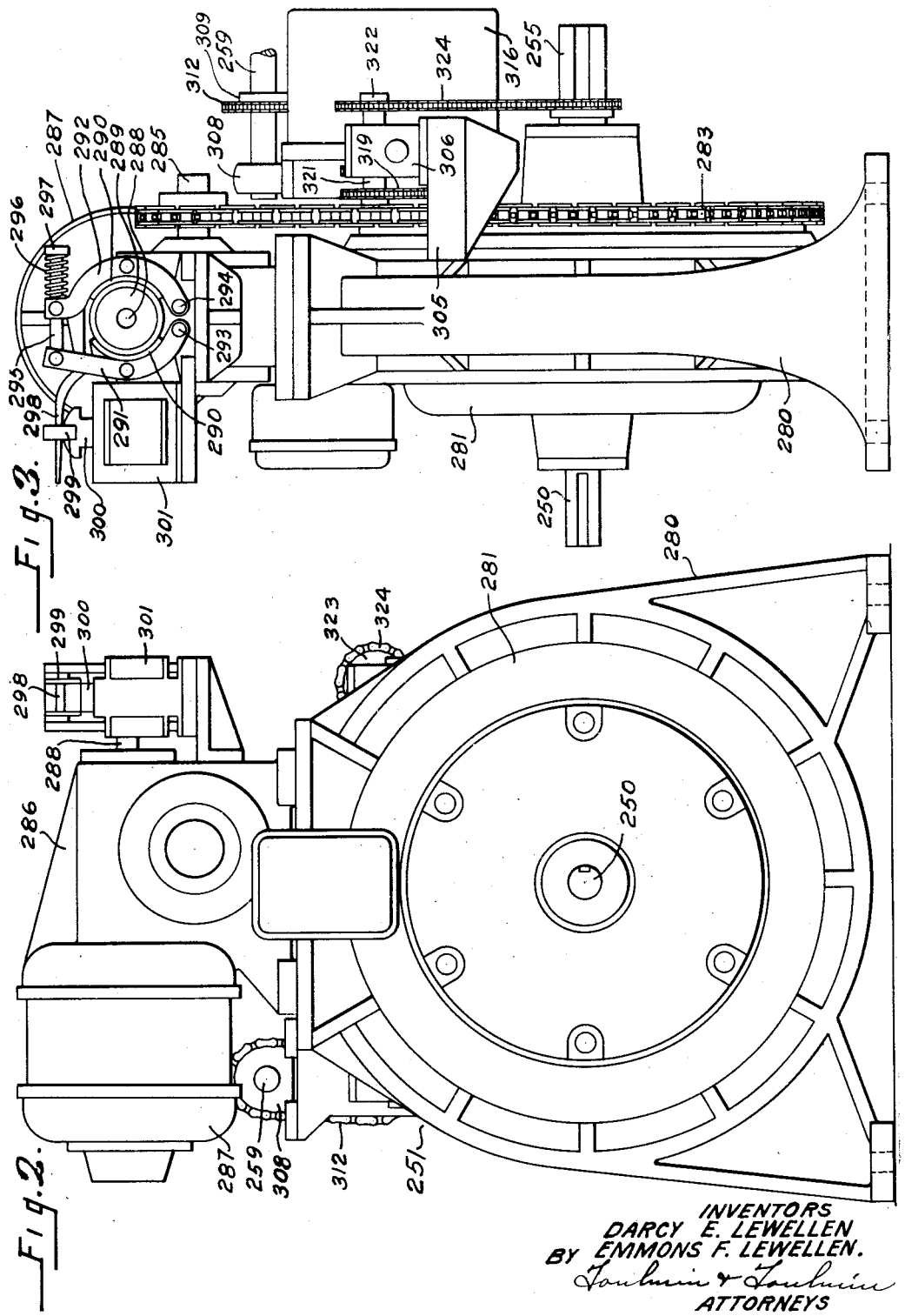

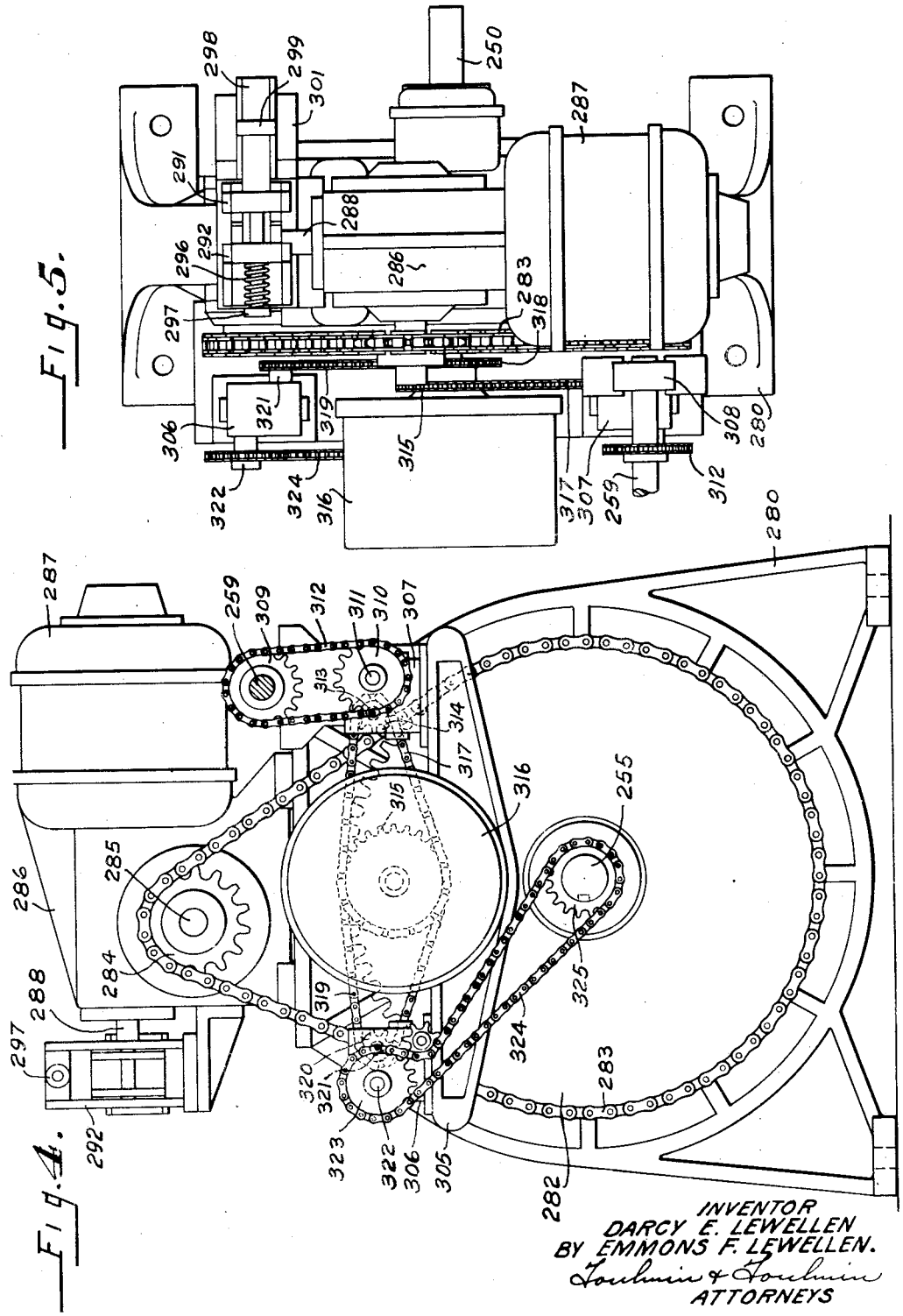

INVENTORS
DARCY E. LEWELLEN
EMMONS F. LEWELLEN.
BY Toulmin & Toulmin
ATTORNEYS

Patented May 17, 1938

2,117,484

UNITED STATES PATENT OFFICE 2,117,484

SPEED SYNCHRONIZING DEVICE

Darcy E. Lewellen and Emmons F. Lewellen, Columbus, Ind.

Application September 23, 1935, Serial No. 41,760

22 Claims. (Cl. 198—20)

This invention relates to methods and apparatus for the synchronization of the speeds of two or more devices; and also to the accurate positioning of the elements thereof.

One object of the invention is to provide means for synchronizing the speeds of two mechanically unconnected revolving shafts in order to maintain a constant speed relationship between them and also to bring one of the shafts automatically back into synchronism with the other shaft in the event that a speed variation arises between them.

Another object is to provide a synchronizing switch having devices associated therewith by which this synchronization of the different machines or shafts may be brought about.

Another object is to provide apparatus for causing three or more mechanisms to operate not only in synchronism with one another as regards their speeds but also as to the relative positions of the elements in each mechanism so that these elements will remain in the same positional relationship.

Another object is to provide apparatus wherein three mechanisms, such as conveyors, are so arranged that two of the mechanisms serve the third in such a manner that when either of the subsidiary mechanisms is stopped, the other mechanism will immediately and automatically come up to the full speed of the major mechanisms, not only as regards synchronization of its rotating elements but also as regards the positions thereof.

Another object is to provide apparatus wherein three mechanisms, such as conveyors, are so arranged that when all three of the mechanisms are in operation the two auxiliary mechanisms will be automatically caused to run at one-half the speed of the major mechanism, not only as regards the speed synchronization of its rotating elements, but also as regards the positioning thereof. This latter condition is produced by a relay coil which operates a switch arm, one wire from this relay running to one phase of the power line, the other wire running to another phase of the power line whenever both auxiliary mechanisms are in operation.

In particular it is an object to provide a system containing three conveyors, two of which are arranged to transfer articles to the third conveyor, arrangements being provided wherein each of the minor conveyors runs at half the speed of the major conveyor when both minor conveyors are working or such that when one minor conveyor is stopped, the other minor conveyor is immediately and automatically brought up to the full speed of the major conveyor.

Another object is to provide such an arrangement of three conveyors as described above wherein each minor conveyor has elements at different positions thereon, arrangements being made such that these positioned elements will always remain in the same locations relative to one another regardless of whether one or two minor conveyors are operating.

It is another object of this invention to provide a series of three mechanisms wherein a major mechanism is served by two minor mechanisms, these devices being so arranged that spaced elements on the minor and major conveyors are brought into the proper positional relationship as well as the speeds being brought into proper synchronization.

Another object is to provide a device for accomplishing the bringing of spaced elements on different mechanisms into positional alignment, as well as bringing the mechanisms into speed synchronization with one another.

Another object is to provide apparatus of the above described nature in which the spaced elements of the different mechanisms are automatically brought into the proper positional relationships before the mechanisms are allowed to start operating synchronously.

Another object is to provide a switch device adapted to control not only the synchronization of different mechanisms as to their speeds of rotation but also to control the relative positions of certain elements in these mechanisms and insure these elements being constantly kept in the proper positional relationships.

Another object is to provide automatic means for bringing the elements of two or more mechanisms into predetermined positional relationships during the operation of the mechanisms in the event that these elements depart from the proper relationships, this being accomplished automatically and speed synchronization of the mechanisms likewise being accomplished automatically after any departure therefrom.

This application is a continuation in part of our co-pending application Ser. No. 752,848, filed November 13, 1934, which matured into Patent No. 2,076,202.

Referring to the drawings:

Figure 1 is a diagrammatic layout view showing the arrangement of three conveyor systems arranged to operate in speed synchronism and in positional agreement.

Figure 2 is a side elevation of the spacer adjustment device used in the system of Figure 1.

Figure 3 is a right hand end elevation of a spacer adjustment device shown in Figure 2.

Figure 4 is a side elevation on the opposite side from the view shown in Figure 2.

Figure 5 is a plan view of the spacer adjustment device shown in Figures 2 to 4.

Figure 6 is a plan view with the casing in section of the space control contactor used in the system shown in Figure 1.

Figure 7 is a vertical section through the space control contactor shown in Figure 6 taken along the line 7—7 thereof.

*General construction and arrangement*

Figure 8:
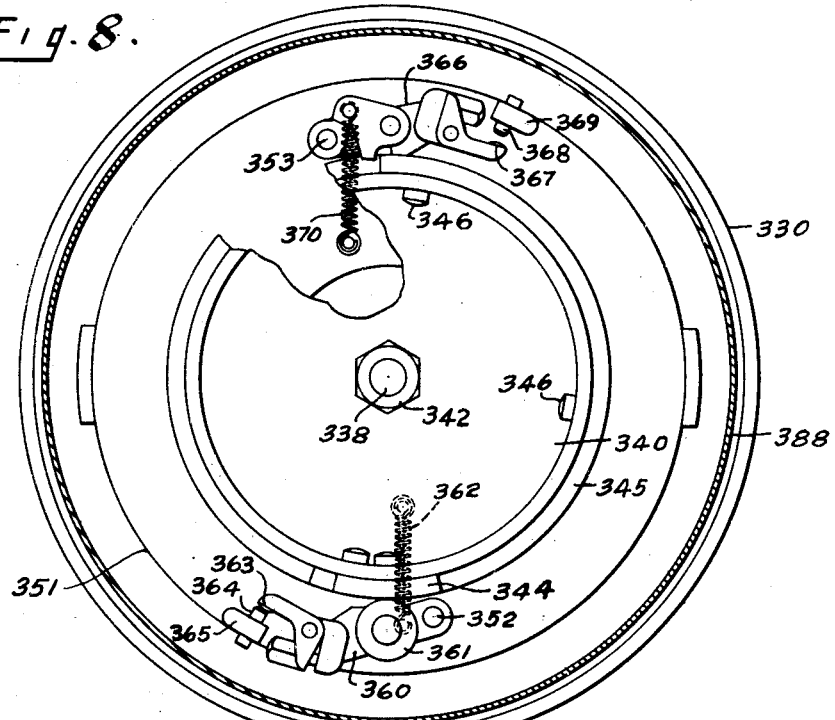
Figure 8 is a cross-section along the line 8—8 in Figure 7.

The synchronization system shown in Figure 1 in general embodies three different machines such as the conveyors generally designated A, B and C. The machine C is a master machine which is manually controlled as to its speed, whereas the machines A and B are subsidiary machines controlled both as to position and speed by the master machine C. In particular the machine C consists of a variable speed transmission 201 having a driving motor 202 driving the input shaft 203 thereof through the driving chain 204 (Figure 1). This variable speed transmission 201 is of the type described in U. S. Patent to Lewellen, et al, No. 2,076,202, dated April 6, 1937, and is similarly provided with a pilot motor or speed adjusting motor 205 arranged to drive the screw shaft 206 by means of the drive chain 207. The actuation of the pilot motor 205 causes the variable speed transmission to be adjusted in a manner similar to that already described in the above mentioned Lewellen, et al Patent No. 2,076,202 by rotating the screw shaft 206. The hand wheel 208 on the screw shaft 206 may optionally be used to adjust the variable speed transmission 201 manually.

The pilot motor or speed adjusting motor 205 is controlled through the line 209 connected to the push button station 210 having the push buttons 211 and 212. By depressing the push button 211, the pilot motor 205 is caused to operate in a direction of increasing the output speed of the variable speed transmission, whereas the depression of the push button 212 causes a decrease in the output speed. In this manner the adjustment of the master variable speed transmission 201 may be remotely controlled from any desired point. To the output 213 is connected an electrical tachometer 214 having a line 215 running to the tachometer indicator 216. The latter shows the output speed at which the output shaft 213 of the master variable speed transmission 201 is being operated, enabling the operator to adjust the machine to any desired speed. The output shaft 213 is connected to the input shaft 217 of the reduction unit 218, the output shaft 219 of which carries the sprocket 220, around which passes the master conveyor chain 221. The latter is provided at spaced intervals with lugs 222, an interval of ten feet being found convenient in one installation. The master conveyor chain 221 by means of the lugs 222 operates trolleys arranged on tracks (not shown) and pushed by the lugs 222.

In a particular installation in a packing house, the master conveyor 221 is used to transport carcasses of animals which have been slaughtered. The master conveyor 221 passes around various guide sprockets 223 so that the conveyor is guided in its course in any desired manner.

Also connected to the output shaft 213 of the master variable speed transmission by the drive chain 224 is a master synchronizing transmitter 225, called a "Selsyn sender" by workers in the electrical art. This master synchronizing transmitter 225 operates on the synchronous current principle and serves to control other synchronizing receivers in other parts of the apparatus as mentioned below.

Associated with the master synchronizing transmitter 225 is a synchronizing differential 226 called a "Selsyn differential" by workers in the electrical art. The synchronizing transmitter 225 and the differential 226 are of a conventional type, the details of which form no part of the present invention.

Arranged adjacent the conveyor 221 is the conveyor chain 230 which passes around guide sprockets 231 in any desired path. The conveyor chain 230 is associated with the subsidiary machine A and in one part of its course passes around a guide sprocket 232 arranged upon a shaft 233 connected to an arm 234 carrying the shaft 235 upon which is mounted the transfer table 236. The latter serves the purpose of receiving the articles from the trolleys accompanying the conveyor chain 230 and transfers them to the master conveyor chain 221. The subsidiary conveyor chain 230 is driven by the variable speed transmission 237 from the motor 238 through the driving chain 239, connecting it to the input shaft 240 thereof. As in the case of the variable speed transmission 201, a pilot motor 241 operates the screw adjustment shaft 242 through the driving chain 243, the shaft 242 likewise having the hand wheel 244. The output shaft 245 of the variable speed transmission 237 is connected to one side of a synchronizing switch 246 similar in form and arrangement to the synchronizing switch described in the previously mentioned U. S. patent to Lewellen, et al., No. 2,076,202, dated April 6, 1937.

The opposite side of the synchronizing switch 246 is connected to the shaft 247 driven by the synchronizing receiver 248, known to electrical workers by the name "Selsyn receiver". The latter is of a conventional type and its details form no part of the present invention. The output shaft 245 of the variable speed transmission 237 is connected to the input shaft 250 of the spacer adjustment device generally designated 251 and shown in detail in Figures 2 to 5 inclusive. This spacer adjustment device 251 will be described in detail below, and serves to bring the lugs 252 upon the subsidiary conveyor chain 230 and the lugs 253 upon the subsidiary conveyor chain 254 into a predetermined positional relationship with the lugs 222 upon the master conveyor chain 221 and does this without disturbing the speed synchronization thereof.

From the spacer adjustment device 251, the shaft 255 leads into the reduction unit 256, and the output shaft 257 carries the sprocket 258 arranged to drive the subsidiary conveyor 230. Also extending from the spacer adjustment device 251 is the shaft 259, terminating in the bearing 260 upon the variable speed transmission 261. The shaft 259 is connected to the output shaft 262 by the drive chain 263.

The shaft 259 is also drivingly connected through the drive chain 263 to one side of the synchronizing switch 264, the opposite side of which is connected through the shaft 265 to the synchronizing receiver 266. The latter is likewise of the type called a "Selsyn receiver" by workers in the electrical art.

The variable speed transmission 261 is likewise provided with a screw adjustment shaft 267 having a hand wheel 268 and a drive chain 269 connecting it to the pilot motor 270. The driving motor 271 is drivingly connected to the input shaft 272 of the variable speed transmission 261 by the drive chain 273. The variable speed transmissions 261 and 237 are likewise of a type similar to that previously mentioned and similarly controlled by their pilot motors. The pilot motor 241 is controlled as to its actuation by the synchronizing switch 246 responsive to the synchronizing receiver 248, whereas the pilot motor 270 is similarly controlled by the synchronizing switch 264 responsive to the synchronizing receiver 266. The synchronizing receivers 248 and 266 are in turn controlled by the synchronizing transmitter 225 through the differential 226. The differential 226 serves to drive the subsidiary conveyor chain 230 or 254 at the same speed as the master conveyor chain 221 when only one of the subsidiary conveyor chains is being operated. When both subsidiary conveyor chains 230 and 254 are operated, however, each is driven at half the speed of the master conveyor chain 221 through the action of the differential 226.

The synchronizing receivers 248 and 266 are responsive to the synchronizing transmitter 225 to maintain exactly the same rotational speeds and consequently insure the same conditions of operation for the mechanism controlled thereby. The output shaft 262 of the variable speed transmission 261 is connected to the input shaft 274 of the reduction unit 275 having its output shaft 276 carrying a sprocket 277 arranged to drive the subsidiary conveyor chain 254. The guide sprockets 278 serve to guide this chain at various points in its course.

*The spacer adjustment device*

The spacer adjustment device 251, more particularly shown in Figures 2 to 5 inclusive, consists of a base or pedestal 280 arranged to rotatably receive the planetary transmission housing 281. The transmission housing 281 contains planetary gearing of a conventional type, to the opposite sides of which the shafts 255 and 250 are connected respectively. The housing 281 carries the sprocket 282 (Figure 4), which is connected by the sprocket chain 283 to the sprocket 284 upon the shaft 285 leading from the gear reduction unit 286.

The gear reduction unit 286 is connected to the motor 287. By this mechanism the motor 287 is caused to rotate the planetary transmission housing 281 within the pedestal or frame 280. By revolving the planetary transmission housing 281, it is possible to change the positional relationship between the sprocket 258 upon the reduction unit 256 and the variable speed output shaft of the variable speed transmission 237 without changing their speeds.

Projecting from the gear reduction unit 286 is the shaft 288 carrying the brake drum 289 engaged by the brake bands 290 (Figure 3) on the brake levers 291 and 292. The latter are pivotally supported at 293 and 294 respectively and their upper ends are interconnected by the rod 295 having a spring 296 abutting at one end against the nut 297 and at the other end against the brake lever 292. The arm 298 connected by the link 299 to the armature 300 of the solenoid 301 serves to actuate the brake. Consequently, when the driving motor 287 is energized, the brake is instantly released by the action of the solenoid 301 and the brake bands 290 freed from engagement with the brake drum 289.

Mounted on the pedestal 280 is a shelf 305 upon which are arranged the speed reduction units 306 and 307 respectively. The previously mentioned shaft 259 coming from the variable speed transmission 261 is rotatably supported in the bearing block 308 (Figure 3) and carries a sprocket 309 arranged to drive a sprocket 310 on the input shaft 311 of the speed reduction unit 307 by means of the sprocket chain 312. The output shaft 313 of the speed reduction unit 307 carries the sprocket 314, which is drivingly connected to the sprocket 315 of the space controlled contactor 316 by the sprocket chain 317.

Similarly, the other sprocket 318 of the space controlled contactor 316 is drivingly connected by the sprocket chain 319 to the sprocket 320 upon the output shaft 321 of the speed reduction unit 306. The input shaft 322 of the latter carries the sprocket 323 which is drivingly connected by the sprocket chain 324 to the sprocket 325 upon the shaft 255.

*Space control contactor*

The space control contactor 316 has for its purpose the delaying of the start of one of the minor transmissions or machines until the moving parts of the machines running have arrived at the proper relative positions with reference to the machine to be started; and also for the purpose of correcting any drifting out of position which may occur during the operations of the machines.

The space control contactor consists of a supporting plate 330 having an inwardly projecting sleeve-like portion 331 (Figure 7). Rotatably supported within this sleeve-like portion 331 upon the anti-friction bearings 332 is a sleeve 333 carrying the sprocket 315 previously mentioned.

The collar 334 threadedly engaging the sleeve 333 maintains the sprocket 315 and the inner race of one of the anti-friction bearings 332 in proper relationship. The opposite end of the sleeve 333 carries an outer sleeve 335 subsequently to be described, this being held in place by the threaded collar 336 upon the end of the sleeve. Within countersunk portions in the ends of the collars 334 and 336 are arranged the anti-friction bearings 337, which serve to rotatably support the shaft 338 upon which the sprocket 318 is held by means of the threaded nut 339.

The shaft 338 rotates freely within the sleeve 333 by means of the anti-friction bearings 337 and carries a pair of disks 340 and 341 on the end opposite the sprocket 318. The disks 340 and 341 are held in position by the threaded nut 342. The disk 340 is provided with a cylindrical flange 343 carrying a pair of peripheral cam portions 344 and 345 spaced in different axial positions upon the flange 343 and held in position by the screws 346. Similarly, the disk 341 carries a cam portion 347 arranged in a similar manner upon the periphery of the cylindrical flange 348 and held in position by the screws 349.

Figure 9:
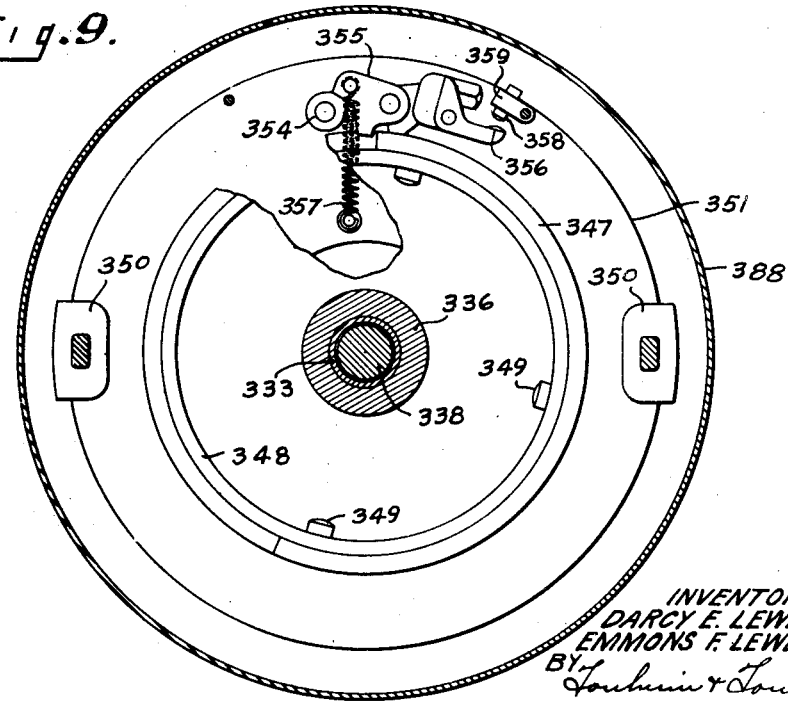
Figure 9 is a cross-section along the line 9—9 of Figure 7.

On the outer sleeve 335 mounted upon the inner sleeve 333 (Figure 7) are mounted the outer projecting arms 350 which support at their outer ends the switch disk 351 (Figure 6). Mounted upon the switch disk 351 are the switch supporting posts 352, 353 and 354 (Figures 6, 8 and 9). The switch post 354 serves to support the moving elements of the switch 355 having the movable contact 356 and urged into action by the spring 357 under the influence of the cam portion 347 (Figure 9). The switch disk 351 also carries the fixed contact 358 arranged to engage the movable contact 356 and mounted upon the arm 359. Consequently, as the cam disk 341 rotates upon the shaft 338, the successive engagement of the cam portion 347 with the switch 355 will cause the movable contact 356 to become engaged and disengaged with the fixed contact 358.

Similarly, the post 352 carries a switch 360 (Figure 8) having an operating roller 361 arranged to engage the cam portion 344 upon the cam disk 340 and actuated by the spring 362. The switch 360 is provided with a movable contact 363 which is forced into engagement with a fixed contact 364 upon an arm 365 supported by the switch disk 351 in response to the engagement and disengagement of the cam portion 344 with the switch actuating roller 361. Diametrically opposite the switch 360 and mounted upon the switch post 353 is the switch 366, the movable elements of which carry the movable contact 367 engaging the fixed contact 368 upon the arm 369 attached to the switch disk 351 (Figures 6 and 8). The switch 366 is actuated in one direction by the spring 370 and in the other direction by the cam element 345 upon the cam disk 340.

The switches 355 and 366 are of a "snap action" type arranged to close and open the contacts with a rapid motion so as to reduce arcing to a minimum. The details of these switches and of the remaining switch 360 form no part of the present invention and are of a conventional type.

Mounted on the outer sleeve 335 are insulating rings 371 carrying the collector rings 372, 373, 374, 375 and 376 respectively (Figure 7). These collector rings are respectively engaged by the contact fingers 377, 378, 379, 380 and 381. The collector rings are connected to the switch elements in a manner described below and in this manner the circuit is maintained between the device and the outside electrical units.

The fixed contacts 368 and 358 are interconnected by the common lead 382 (Figure 11) and this common lead is connected by the line 383 to the collector ring 374. Similarly the fixed contact 364 of the switch 360 is connected by the line 384 to the collector ring 373. The movable contact 363 of the switch 360 is connected to the collector ring 372 by the line 385. The movable contact 356 of the switch 355 is connected by the line 386 to the collector ring 375. Finally the movable contact 367 of the switch 366 is connected to the collector ring 376 by the line 387.

It will be observed that the contacts 363 and 364 of the switch 360 are engaged while the contacts 367 and 368 of the switch 366 are disengaged (Figure 8) due to the respective positions of their cam portions 344 and 345 upon the cam disk 340. The contacts 363 and 364 become engaged only after the lugs 252 and 253 upon the conveyor chains 230 and 254 (Figure 1) become properly positioned relatively to one another, and as will be seen later, postpone the starting of the driving motors of these conveyors until this positioning has taken place.

The contacts 363 and 364 are thus engaged when the shafts or moving parts of the two conveyors are properly positioned and the lugs properly spaced, whereas the contacts 368 and 367 of the switch 366 or the contacts 358 and 356 of the switch 355 are engaged when the shafts or moving parts are not properly positioned.

The switch 360 causes the parts to be properly spaced or positioned before the driving motors are brought into operation whereas the switches 366 and 355 serve to correct any drifts from position which may take place during the operation of the device according to the operation of the electrical device hereinafter described.

The internal parts of the space control contactor 316 are protected from dust and injury by means of the casing 388. The conduits 389 serve to convey the previously mentioned leads from the various switch contacts to the collector rings.

*Electrical equipment*

Figure 10:
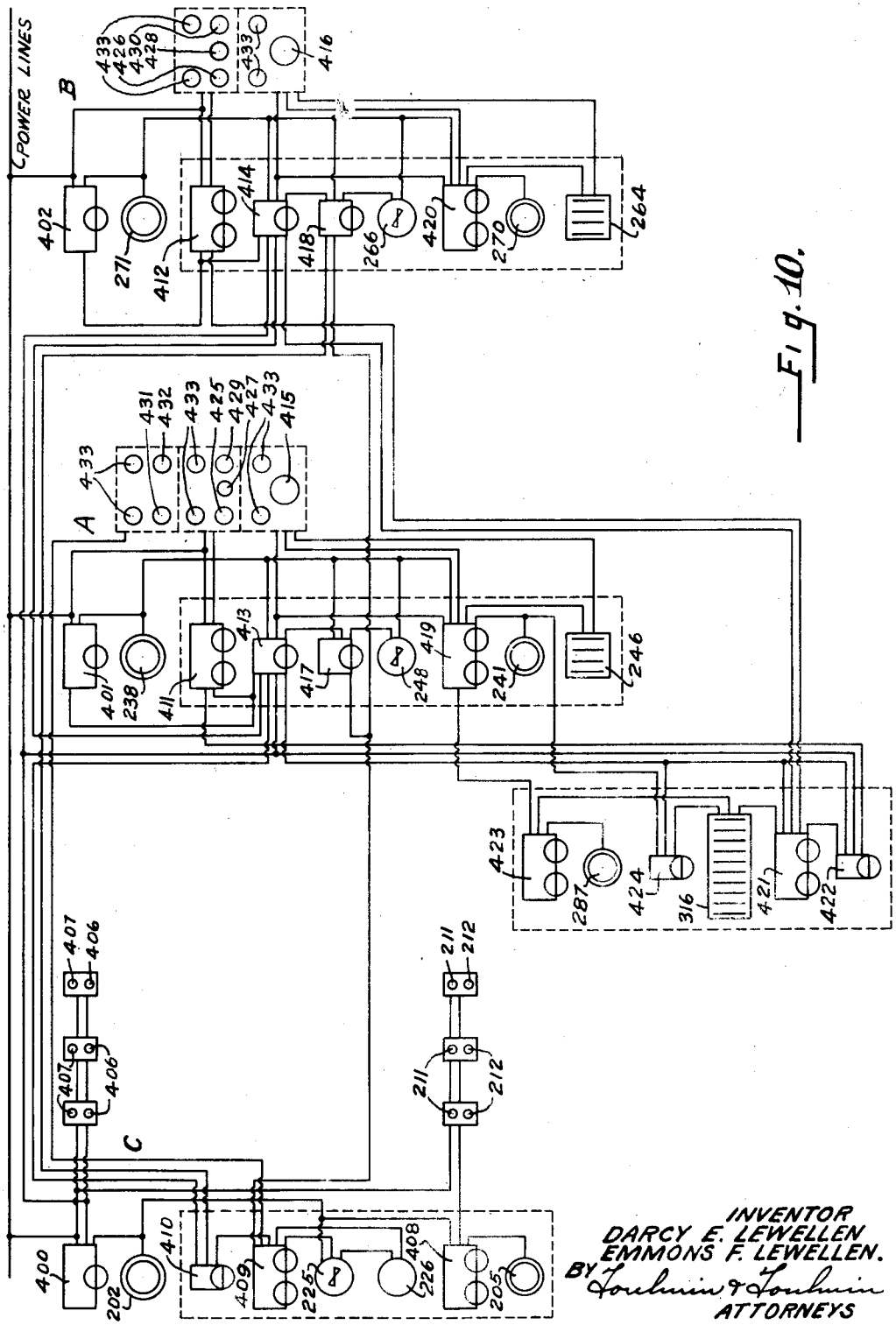
Figure 10 is a simplified wiring diagram showing the relative positions and arrangement of the different electrical units employed in the arrangement of this invention shown in Figure 1.
Figure 11:
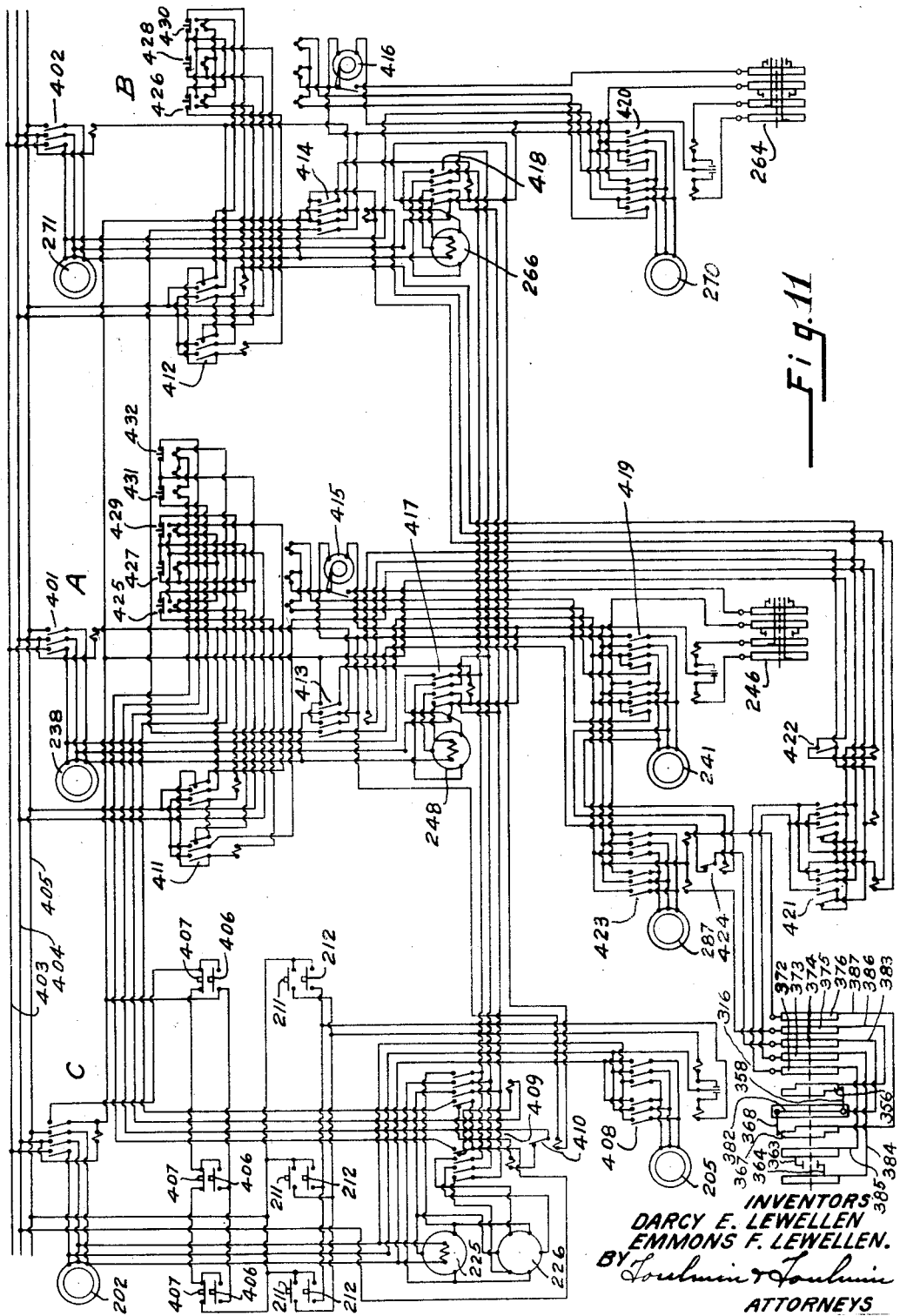
Figure 11 is a schematic wiring diagram showing the complete connections of the device of Figure 10.

The electrical equipment which is employed in the operation of a preferred embodiment of the invention is shown in simplified form in Figure 10 and in complete form in Figure 11. As shown in Figure 10, the respective driving motors 202, 238 and 271 of the conveyor units A, B and C (Figure 1) are provided with starting switches 400, 401 and 402 respectively, these starting switches being of the magnetically operated type receiving power current from the power lines 403, 404 and 405. The starting switch 400 is operated by the starting switch buttons 406 and stop switch buttons 407, these being placed at any desired points.

The master conveyor unit C, as has been previously described, is provided with a pilot motor 205 which is under the control of a double magnetic multiple pole contactor 408, which in turn is operated by the push buttons 211 and 212. The push button 211 operated the contactor 408 to cause the pilot motor 205 to adjust the variable speed transmission 201 so that it increases its speed, whereas the push button 212 operates the pilot motor 205 in the opposite direction to decrease the speed. The push button 211 will therefore be termed the fast speed push button and the push button 212 the slow speed push button.

The master or major conveyor unit C is likewise equipped, as previously stated, with a Selsyn transmitter 225 and a Selsyn differential 226 controlled by the double magnetic multiple pole contactor 409 and the single pole magnetic relay 410.

These electrical units in the master or major conveyor unit C are interconnected in the manner shown in Figure 11. The magnetic relay 410 serves to prevent the operation of both conveyor units A and B at a double speed, reserving this double speed for the occasion when but one of these minor conveyors is in operation.

The minor conveyor units A and B are provided with starting switches 401 and 402 controlling their driving motors 238 and 271 and likewise with the double magnetic multiple pole contactors 411 and 412, and also the multiple pole single contactors 413 and 414, the controllers 415 and 416, and the multiple pole single contactors 417 and 418.

The pilot motors 241 and 270 of the minor conveyor units A and B are controlled respectively by the double magnetic multiple pole contactors 419 and 420 in accordance with the operation of the rotary contactors or synchronizing switches 246 and 264 previously described.

The minor conveyor unit A is provided with the rotary space control contactor 316 associated with the spacer adjustment device 251, these being connected to the spacer selector or double magnetic multiple pole contactor 421 with which is associated the time delay relay 422. The motor 287 which operates the spacer adjustment device 251 is controlled by the double magnetic multiple pole contactor 423 with which is associated the single pole magnetic relay 424, these units being connected in the manner shown in Figures 10 and 11 and operating in a manner hereafter described.

The minor conveyor units A and B are controlled by the corresponding pairs of manual switches 425 and 426 or 427 and 428 or 429 and 430 in a manner subsequently to be described, these switches being arranged to the right of the assembly of electrical units for each conveyor unit as shown in Figure 10. The manual switches 431 and 432 are also provided in connection with the minor conveyor unit A and adjacent the manual switches 425, 427 and 429 for a purpose hereinafter described.

Signal lamps 433 associated with the various manual switches indicate the condition of the circuit and the manner in which it is being controlled at any instant.

As previously stated, the electrical system is arranged to operate in two different manners. If both of the minor conveyors A and B are operating, then each operates at half speed relatively to the major conveyor C, whereas if only one of these minor conveyors is operating, it is automatically arranged to operate at full speed.

The manual switches 425, 427 and 429 serve for setting the operation of the driving motors of the conveyor units A and B. The closing of the switch 425 or 426 starts the particular driving motor 238 or 271 through the starting switches 401 or 402 and contactors 411 or 412 regardless of whether any of the other units are running or are stopped.

On the other hand, the closing of either the manual switches 427 or 428 stops the particular driving motor 238 or 271 respectively regardless of whether the driving motor was operating in synchronism with any of the other conveyor units or whether it was running independently. Finally, the closing of either of the manual switches 429 or 430 causes the minor conveyor units A or B to operate in synchronism with the major conveyor unit C.

The signal lamps 433 indicate at a glance which of these switches is closed and what setting has been obtained. The particular setting of these switches 425 to 430 inclusive may be accomplished regardless of whether the particular unit to which the switch is attached or any of the other units are running or halted and the starting or stopping of any of the other units does not require a resetting by means of these switches. If the manual switch 425 is depressed while the minor conveyor unit is operating in synchronism with the major unit C, then no further speed change will be obtained except by hand. If the button 429 is depressed while the minor conveyor unit is running independently of the others or is stopped, then the unit A will automatically come into synchronism.

The controllers 415 and 416 provide the impulse circuit through the rotary contactors 246 and 264 of the speed synchronizing control for the minor conveyor units A and B. As previously stated, the Selsyn transmitter or transmitter and differential causes the Selsyn receivers to run at the normal or double speed rates respectively in synchronism with the Selsyn transmitter and differential, the latter being driven from the variable speed shaft of the conveyor unit C. Each Selsyn receiver unit 266 or 248 rotates half of its rotary contactor mechanism 246 or 264, the other half being rotated from the variable speed shaft of the variable speed transmission 237 and 261 in the manner previously described. Power is supplied to the Selsyn transmitter unit 225 only when the driving motor 202 is running.

The switch buttons 431 and 432 operate the double magnetic multiple pole contactor 409 of the major conveyor unit C. One side or the other of the circuits through the contactor 409 is always engaged with the major unit C or either of the minor units A or B is operating or stopped. One of these circuits directly connects the Selsyn transmitting circuit from the Selsyn transmitter 225 to the Selsyn receivers 248 and 266 whereas the other circuit connects the Selsyn transmitting circuit from the Selsyn transmitter 225 by way of the Selsyn differential 226 to the Selsyn receivers 248 and 266.

The depression of the switch button 432 causes the contactor 409 to operate the Selsyn receivers 248 and 266 at the normal speed. If all of the conveyor units A, B and C are shut down or if the major conveyor unit C and only one of the minor conveyor units A or B are operating in synchronism, the depression of the push button 431 will operate the contactor 409 to cause the Selsyn transmitting circuit to pass through the Selsyn differential 226 and cause the Selsyn receivers 248 and 266 to operate at the double rate.

If both of the minor conveyor units A and B are running in synchronism with the major conveyor unit A, the contactor 409 can not be set for double speed operation, for if the major conveyor C and one of the minor conveyors A or B are operating in synchronism and the contactor 409 has been set for operating the Selsyn receiver 248 or 266 at the double rate, the coming of the second minor conveyor unit A or B into synchronism causes the contactor 409 to be automatically reset to connect the Selsyn transmitting circuit for operating the Selsyn receivers 248 and 266 at the normal rate. When the contactor 409 is set for this normal rate, the starting or stopping of any of the units does not require a resetting of the contactor 409. If the switch button 431 has been depressed to set the contactor 409 for the double rate while all of the conveyor units A, B and C are shut down, and all of these conveyor units are then started to operate in synchronism, the contactor 409 is automatically reset for the normal speed rate.

The contactor 409 can not be set for the double speed rate except when only one of the minor conveyor units A or B is operated in synchronism with the major conveyor unit C and the starting or stopping of the latter and one of the minor conveyor units A or B while operating in synchronism will not disturb the double rate setting. Whenever the second minor conveyor unit is brought into synchronism, however, and the contactor 409 has reset automatically for the normal rate, a later return to the double rate is obtained only by resetting the contactor 409 by hand. This interlocking arrangement to prevent the operation of the minor conveyors A and B at the double speed rate while both are running is prevented by the operation of the relay 410 associated with the major conveyor unit C and the contactor 409.

The multiple pole single magnetic contactors 417 and 418 connect both the power and Selsyn transmitting circuits to the Selsyn receivers 248 or 266 only when the particular minor conveyor unit A or B is operating in synchronism with the major conveyor unit C. When the particular minor conveyor unit A or B is shut down or when it is operating independently of the others, the circuits to its Selsyn receiver are open.

The double magnetic multiple pole contactors 411 or 412 are arranged to be disengaged by the operation of the switch buttons 427 or 428 respectively. When this occurs, the circuits through these contactors 411 or 412 are open and the particular unit will not operate. With the circuit closed by either of the switch buttons 425 or 426 for independent operation of the minor conveyor unit A or B, the starting switch 401 or 402 is operated directly. With the circuits through the contactors 411 or 412 set for synchronous operation by depressing the switch buttons 429 or 430, however, then the circuits are closed through the contactors 413 or 414 and 417 or 418 while the particular unit A or B is operating. The operation of the contactors 413, 414, 417 and 418 when starting is dependent upon the sequence of the spacer selector contactor 421 and time relay 422.

With either of the minor conveyor units set for synchronous operation with the major conveyor unit C and running, speed synchronism therebetween is obtained by the rotary contactors 246 and 264 as described in the previously mentioned Patent No. 2,076,202. With half of the rotary contactors 246 or 264 rotating at a speed corresponding to the speed of the major conveyor C, a slightly faster or slower operation of the minor conveyor transmissions rotates the other half of the contactors 246 or 264 to bring into engagement the circuit receiving impulses from the controllers 415 or 416.

This causes the contactor 419 or 420 to operate and energize its pilot motor 241 or 270 during the impulse interval. This incremental correction of the minor conveyor transmission speed setting returns the minor conveyor to speed synchronism with the major conveyor C.

A rapid speed change such as would be necessary when the major conveyor speed is altered manually by the operation of the manual switches 211 or 212 is obtained by the continuous operation of the contactors 419 or 420 and their pilot motors 241 or 270 through the secondary circuit of the rotary contactor 246 or 264. As the speed setting of the particular minor conveyor approaches synchronism, the continuous speed changing circuit of the rotary contactors 246 or 264 is disengaged, after which the incremental operation of the pilot motor 241 or 270 through the rotary contactor and controller circuit thereof returns the minor conveyor speed to synchronism in the above manner.

With the contactor 411 set for synchronous operation, the engagement of the "start" button 406 starts driving motor 202 of the conveyor C as previously described and starts conveyor A by closing the time delay relay 422 associated with the spacer selector contactor 421 and then one of the halves of the contactor 421 for the minor conveyor unit A.

With the contactor 412 of the minor conveyor unit B set for synchronous operation, the engagement of one of the start buttons 406 starts driving motor 202 of conveyor C as previously described and starts conveyor B by operating the other half of the contactor 421.

When one of the minor conveyor units A or B has been stopped or has been operating independently, and is reset by depressing button 429 or 430 to operate in speed synchronism with the major conveyor C and the other minor conveyor, the latter of which is already operating, the previous operation of the half of the contactor 421 has set circuits which prevent the immediate closing of the other half of the contactor 421 until the starting contacts 363 and 364 of the rotary space control contactor 316 come into engagement.

The engagement of these starting contacts occurs at the instant that the chain lug 253 of the conveyor unit B, which is assumed to be operating, reaches the point where its position laps the chain lug 252 of the conveyor unit A, which is assumed not to be running. The consequent closing of the other half of the contactor 421 following the engagement of the starting contacts 363 and 364 of the rotary space control contactor 316 closes the circuits for operating the contactors 413 or 414 of the particular minor conveyor unit which is stationary so that the particular starting switch 401 or 402 thereof is operated to start the minor conveyor driving motor 238 or 271.

After this occurs, the speed synchronizing units including the multiple pole single contactors 417 and 418, the Selsyn transmitter 225 and receivers 248 and 266; the double magnetic multiple pole contactors 419 and 420; the pilot or speed adjusting motors 241 and 270; and the rotary contactors 246 and 264 immediately function to obtain speed synchronism between the conveyors in the manner previously described.

The arrangement of the circuit requires that both of the minor conveyor units A and B must be running in order to restore the predetermined space relationship between the conveyor chain lugs 252 and 253, the circuit being through the multiple pole single contactors 413 and 414 and the single pole magnetic relay 424. The relay 424 also operates to prevent a space correction while the speed synchronizing units are operating through the circuit from the relay 424 to the pilot motor 241.

With the speed synchronized and a space correction required, then the circuits operating by the functioning of the second set of contacts of the rotary space control contactor 316 are brought into operation, these being the contacts 355 and 356 or 367 and 368 (Figures 8 and 9).

When this occurs, the double magnetic multiple pole contactor 423 operates the transmission rotating motor 287 to rotate the planetary transmission 202 and properly position the conveyor chain lugs 252 and 253 relatively to one another. When the chain lug 252 of the minor conveyor unit A has been properly set ahead or back by means of this control arrangement, the operation of the transmission rotating motor 287 automatically stops through the action of the rotary space control contactor 316. The operation of the latter may be interrupted at any time by the operation of the speed synchronizing control of the minor conveyor unit A or by stopping either one of the minor conveyor units A or B.

With all three of the conveyor units A, B and C stopped and with both of the minor conveyor units A and B set for synchronous operation, when the start button 406 is depressed to start all three units, the major conveyor driving motor 202 and the driving motor 271 of the minor conveyor unit B will start operation at once. As soon as the lugs 253 of the conveyor chain 254 in the minor conveyor unit B have moved to the proper positions relatively to the lugs 252 on the chain 230 of the minor conveyor unit A, the driving motor 238 of the minor conveyor unit A then automatically starts in the manner previously described.

The time delay relay 422 performs this function of preventing the starting of the two minor conveyor unit driving motors 238 and 271 when it is desired to operate both minor conveyor units at the same time. The time delay relay thus causes the starting motors 271 and 238 to start with a time interval between them.

It will be observed that the contactors 409, 411, 412, 413, 414, 417, 418 and 421 are provided with holding circuits. All of the double contactors except 421 are also mechanically interlocked in addition to the electrical interlocks provided for several of the circuits.

It will be understood that we desire to comprehend within our invention such modifications as may be necessary to adapt it to varying conditions and uses.

Having thus fully described our invention, what we claim as new and desire to secure by Letters Patent, is:

1. A synchronizing system including a major machine and a plurality of minor machines, means for varying the speeds of said minor machines independently of each other and of said major machine, means associated with said minor machines and responsive to the speed of said major machine for synchronizing the speeds thereof with the speed of said major machine, and means associated with said minor machines for maintaining substantially constant relative positions of a moving element of each minor machine.

2. A synchronizing system including a major machine and a plurality of minor machines, means for varying the speeds of said minor machines independently of each other and of said major machine, means associated with said minor machines and responsive to the speed of said major machine for synchronizing the speeds thereof with the speed of said major machine, means associated with said minor machines for maintaining substantially constant relative positions of a moving element of each minor machine, and means for automatically bringing the speed of one of said minor machines back into synchronism with said major machine upon the occurrence of a departure from synchronism therewith.

3. A synchronizing system including a major machine and a plurality of minor machines, means for varying the speeds of said minor machines independently of each other and of said major machine, means associated with said minor machines and responsive to the speed of said major machine for synchronizing the speeds thereof with the speed of said major machine, means associated with said minor machines for maintaining substantially constant relative positions of a moving element of each minor machine, and means for automatically bringing the speed of both of said minor machines back into synchronism with said major machine upon the occurrence of a departure from synchronism therewith.

4. A synchronizing system including a major machine and a plurality of minor machines, means for varying the speeds of said minor machines independently of each other and of said major machine, means associated with said minor machines and responsive to the speed of said major machine for synchronizing the speed thereof with the speed of said major machine, and means associated with said minor machines for maintaining a moving element of each of said minor machines in a predetermined positional relationship.

5. A synchronizing system including a major machine and a plurality of minor machines, means for varying the speeds of said minor machines independently of each other and of said major machine, means associated with said minor machines and responsive to the speed of said major machine for synchronizing the speed thereof with the speed of said major machine, means associated with said minor machines tending to maintain a moving element of each of said minor machines in a predetermined positional relationship, and means for automatically bringing one of said minor machines back into said predetermined positional relationship upon the occurrence of a departure therefrom.

6. A synchronizing system including a major machine and a plurality of minor machines, means associated with said minor machines and responsive to the speed of said major machine for synchronizing the speeds thereof with the speed of said major machine, means associated with said minor machines for maintaining a moving element of each of said minor machines in a predetermined positional relationship, and means for bringing about a positional readjustment of said moving elements without altering the speed synchronization thereof other than during the period of operation of said positional readjustment means.

7. A synchronizing system including a major machine and a plurality of minor machines, means associated with said minor machines and responsive to the speed of said major machine for synchronizing the speeds thereof with the speed of said major machine, means associated with said minor machines for maintaining a moving element of each of said minor machines in a predetermined positional relationship, and means for positionally readjusting said moving elements, said readjusting means being arranged to maintain said speeds in substantially unvarying relationship other than during the period of operation of said readjusting means.

8. A synchronizing system including a major machine and a plurality of minor machines, means associated with said minor machines and responsive to the speed of said major machine for synchronizing the speeds thereof with the speed of said major machine, means associated with said minor machines for maintaining a moving element of each of said minor machines in a predetermined positional relationship, means for halting one of said minor machines while maintaining the other minor machine in operation, means for restarting said halted minor machine, and means for delaying the application of the starting of said minor machine until the completion of the positional readjustment of its moving element with the moving elements of the other minor machine.

9. A synchronizing system including a major machine and a plurality of minor machines, means associated with said minor machines and responsive to the speed of said major machine for synchronizing the speeds thereof with the speed of said major machine, means associated with said minor machines for maintaining a moving element of each of said minor machines in a predetermined positional relationship, means for halting one of said minor machines while maintaining the other minor machine in operation, and means for automatically bringing the other minor machine to a readjusted speed relatively to said major machine to compensate for the stoppage of the first mentioned minor machine.

10. A synchronizing system including a major machine and a plurality of minor machines, means associated with said minor machines and responsive to the speed of said major machine for synchronizing the speeds thereof with the speed of said major machine, means associated with said minor machines for maintaining a moving element of each of said minor machines in a predetermined positional relationship, and means operative upon energizing said system to bring said moving elements into said predetermined positional relationship prior to starting the combined rotation of said moving elements.

11. A synchronizing system including a major machine and a plurality of minor machines, means for varying the speeds of said minor machines independently of each other and of said major machine, means associated with said minor machines and responsive to the speed of said major machine for synchronizing the speeds thereof with the speed of said major machine, means associated with said minor machines for maintaining a moving element of each of said minor machines in a predetermined positional relationship, and manually controlled means for varying the speed of said major machine whereby to automatically alter the speeds of said minor machines into synchronism with said major machine.

12. A synchronized conveyor system comprising a major conveyor and a pair of mechanically disconnected minor conveyors, variable speed means arranged to drive said minor conveyors independently of each other and of said major conveyor, means associated with said major and minor conveyors for synchronizing the speeds thereof with one another, and means for automatically maintaining said minor conveyors in a predetermined positional relationship.

13. A synchronizing system including a major machine and a pair of minor machines, said minor machines having moving elements to be maintained in predetermined, positional relationships, and means responsive to the halting of one of said minor machines for automatically increasing the speed of the other minor machine to a different predetermined relationship with said major machine whereby to compensate for the stoppage of said minor machine.

14. A synchronizing system comprising a major machine and a pair of minor machines, each of said minor machines having a moving element arranged to be maintained in a predetermined positional relationship, said minor machines being arranged to cause their moving elements to serve the moving element of said major machine in alternate sequence, and means responsive to the halting of one of said minor machines to increase the speed of the other minor machine to a different predetermined relationship with said major machine whereby to cause the minor machine which is operating to serve the major machine in the same manner as the two minor machines previously operating.

15. A synchronized conveyor system including a major conveyor and a pair of mechanically disconnected minor conveyors, variable speed means arranged to drive said minor conveyors, means associated with said major and minor conveyors for synchronizing the speeds thereof according to a predetermined arrangement, and means for automatically maintaining said minor conveyors in a predetermined positional relationship relatively to each other, said position maintaining means being arranged to operate prior to said speed synchronizing means whereby to cause said conveyors to come into proper positional relationship before synchronization thereof.

16. A synchronized conveyor system comprising a major conveyor and a pair of mechanically disconnected minor conveyors, variable speed means arranged to drive said minor conveyors independently of each other and of said major conveyor, and means automatically responsive to a departure from a predetermined positional relationship between the two minor conveyors to operate one of said minor conveyors relatively to the other minor conveyor to bring the minor conveyors back into the predetermined arrangement.

17. A synchronized conveyor system comprising a major conveyor and a pair of mechanically disconnected minor conveyors, variable speed means arranged to drive said minor conveyors, means automatically responsive to a departure from a predetermined positional relationship between the two minor conveyors to operate one of said minor conveyors relatively to the other minor conveyor to bring the minor conveyors back into the predetermined arrangement, means for starting and stopping said minor conveyors, and means for preventing the operation of the starting means for one of said minor conveyors until the positioning means therebetween has operated to position said conveyors according to said predetermined arrangement.

18. A synchronized conveyor system comprising a major conveyor and a pair of mechanically disconnected minor conveyors, variable speed means arranged to drive said minor conveyors, means automatically responsive to a departure from a predetermined positional relationship between the two minor conveyors to operate one of said minor conveyors relatively to the other minor conveyor to bring the minor conveyors back into the predetermined arrangement, means for starting and stopping said minor conveyors, means for preventing the operation of the starting means for one of said minor conveyors until the positioning means therebetween has operated to position said conveyors according to said predetermined arrangement, and means for automatically bringing said minor conveyors back into agreement with said predetermined positional arrangement upon a departure therefrom.

19. A synchronized conveyor system comprising a major conveyor and a pair of minor conveyors, variable speed transmissions arranged to drive said minor conveyors, means associated with said major and minor conveyors for synchronizing the speeds thereof with one another, motors for operating said transmissions, means for starting said motors, means for causing the major conveyor motor and one of said minor conveyor motors to start in response to the operation of the starting means therefor, and means for delaying the operation of the starting means for the other minor conveyor driving motor until the first-mentioned minor conveyor moves into a predetermined positional relationship with the last-mentioned minor conveyor.

20. A synchronized conveyor system comprising a major conveyor and a pair of mechanically disconnected minor conveyors, variable speed means arranged to drive said minor conveyors, means associated with said minor conveyors for automatically synchronizing the speeds of said minor conveyors with the speed of said major conveyor, and repositioning means automatically responsive to a departure from a predetermined positional relationship between the two minor conveyors to operate one of said minor conveyors relatively to the other minor conveyor to bring the minor conveyors back into predetermined positional relationship, said repositioning means being arranged to be operative only after speed synchronism is reached.

21. A synchronized conveyor system comprising a major conveyor and a pair of mechanically disconnected minor conveyors, variable speed means arranged to drive said minor conveyors, means associated with said minor conveyors for automatically synchronizing the speeds of said minor conveyors with the speed of said major conveyor, repositioning means automatically responsive to a departure from a predetermined positional relationship between the two minor conveyors to cause one of said minor conveyors to move relatively to the other minor conveyor into said predetermined positional relationship, and means for delaying the operation of said repositioning means responsive to the reaching of a condition of speed synchronism of said shafts.

22. A synchronizing system for synchronizing a plurality of machines both as to speed and relative positions of their moving parts comprising a plurality of machines, means associated with one machine and responsive to the speed of the other machine for synchronizing the speed of said first machine with the speed of said second machine, means associated with said first machine for maintaining a substantially constant position of a moving element of said first machine relatively to a moving element of said second machine, means for halting one of said machines while maintaining the other machine in operation, means for re-starting said halted machine, and means for delaying the starting of said halted machine until the completion of the positional readjustment of its moving element with the moving element of the operating machine.

DARCY E. LEWELLEN.
EMMONS F. LEWELLEN.